May 19, 1970  W. K. BECK  3,513,428
THERMAL SWITCH MECHANISM
Filed Oct. 25, 1967  3 Sheets-Sheet 2
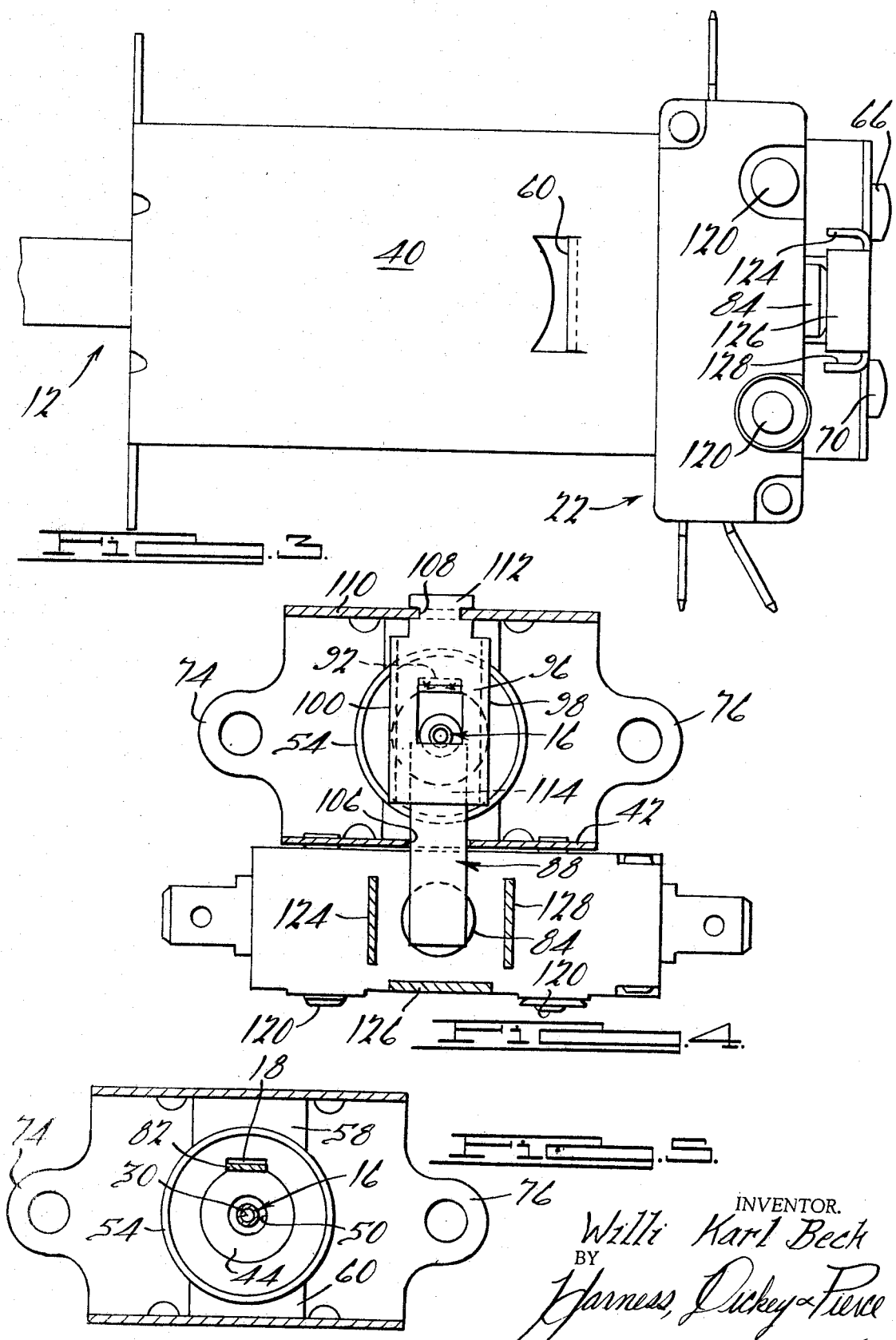
INVENTOR.
Willi Karl Beck
BY
Harness, Dickey & Pierce
ATTORNEYS.

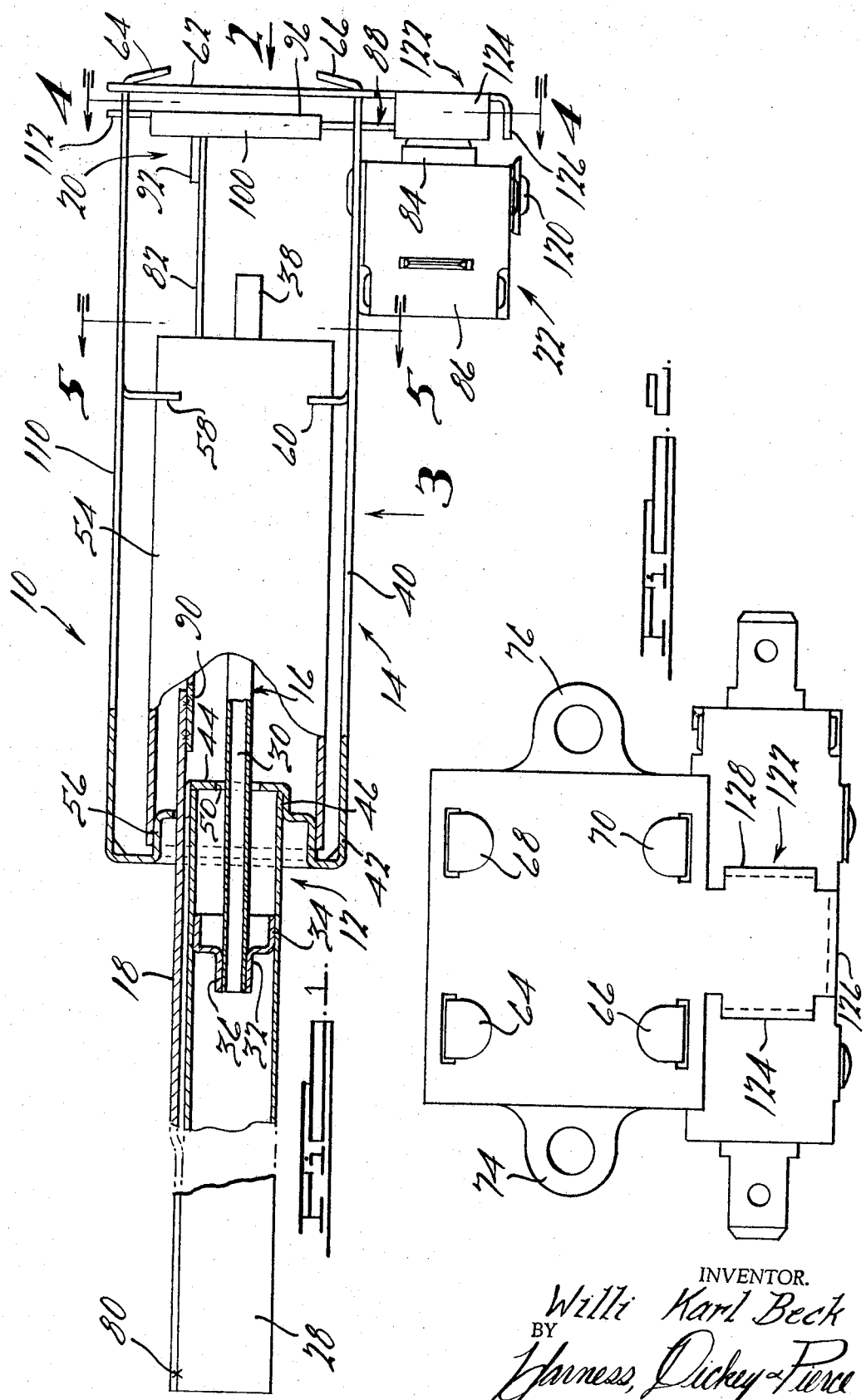

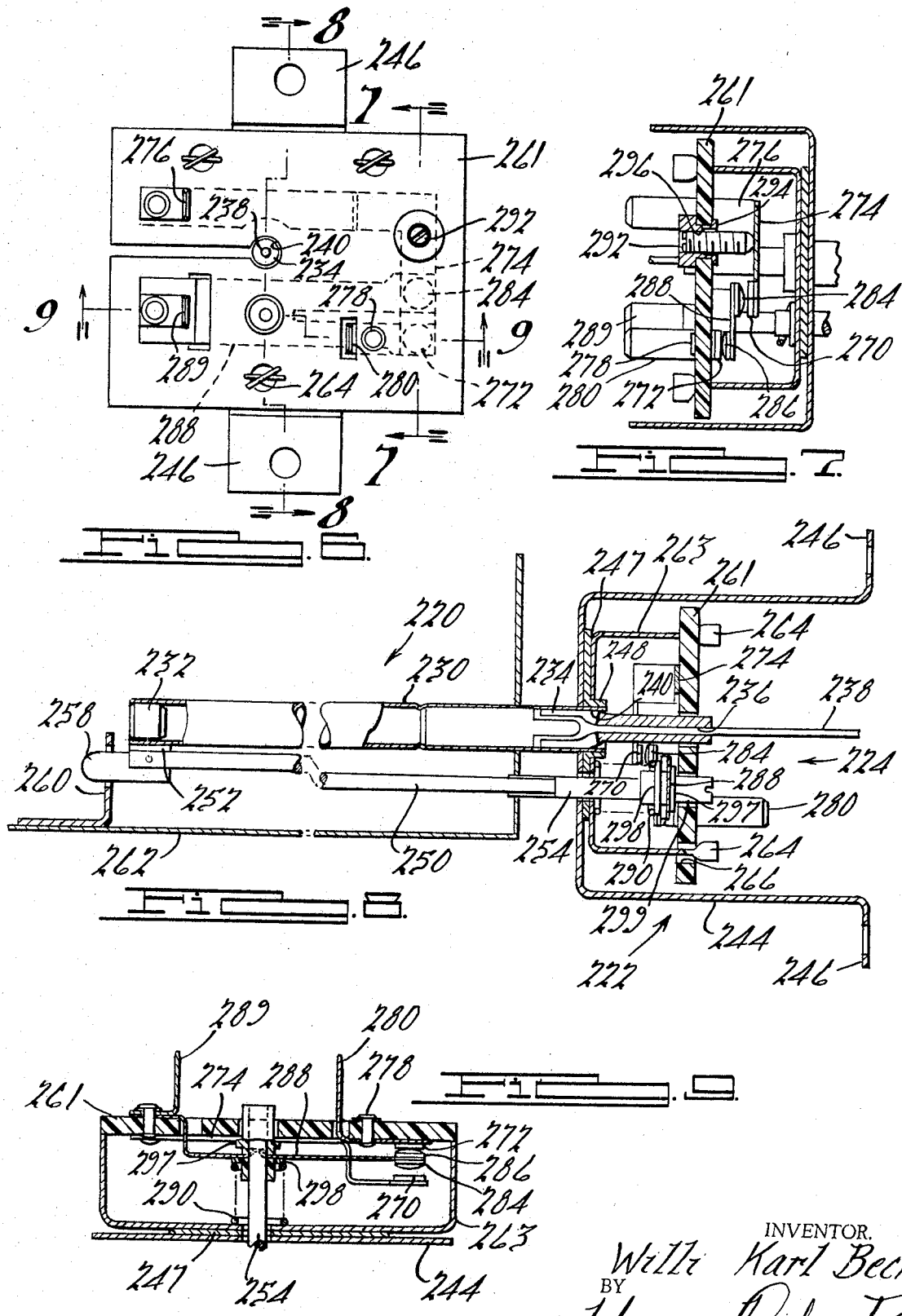

United States Patent Office 3,513,428
Patented May 19, 1970

3,513,428
THERMAL SWITCH MECHANISM
Willi K. Beck, Ann Arbor, Mich., assignor to King-Seeley Thermos Co., Ann Arbor, Mich., a corporation of Michigan
Filed Oct. 25, 1967, Ser. No. 677,968
Int. Cl. H05b 1/02; H01h 37/42, 37/46
U.S. Cl. 337—322                                    13 Claims

ABSTRACT OF THE DISCLOSURE

A temperature responsive switch which is adapted to be utilized in sensing the cavity temperature of an oven capable of achieving relatively high cavity temperatures, the sensor assembly including a thermally expansible fluid disposed in a sealed bulb, the pressure of the fluid in the bulb being indicative of the cavity temperature, and also including an expandable member attached to one end of the hollow tube such that the free end of the expansible member moves to indicate the differential expansion between the bulb and the expandable member. The free end of the expandable member is attached to a motion transmitting mechanism, a portion of which is adapted to selectively engage and disengage a switch operating member in response to changes in temperature within the oven cavity.

---

The purpose of the foregoing abstract is to enable the Patent Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BACKGROUND AND SUMMARY OF THE INVENTION

This invention relates to a thermally responsive switch mechanism and particularly to a dual purpose switch assembly which is adapted to provide a continuous indication of an environmental temperature through a hydraulic or pneumatic assembly and a specific temperature by means of expansible members and a switch connected to respond to the movement of the expansible members.

The assembly of the present invention is particularly adapted to sense the cavity temperature in an oven and, in so doing, providing a dual output signal from the sensor assembly. One portion of the dual assembly provides a pressure variation in a hydraulic or fluid tube in response to changes in cavity temperature and the other portion providing a mechanical movement in response to changes in the environmental temperature. In ovens of the self clean type, it has been found desirable to provide a switch mechanism which is adapted to be calibrated to respond to a preselected temperature for changing the condition of the switch at such time as the oven cavity reaches the preselected temperature, normally this temperature being slightly above the normal oven cooking temperatures.

In the preferred embodiment to be described, the hydraulic or pneumatic pressure which varies in response to temperature changes is fed to a pressure responsive transducer which is utilized in controlling the position of a fixed contact on an oven heat controller by transforming the pressure variation to a changing mechanical movement. In ovens having self cleaning capabilities, it has been found desirable to provide a safety lock for disabling or positively locking the door when the internal temperature of the oven cavity attains a preselected temperature, as for example 550°. Accordingly, the elongating member movement is utilized in actuating a switch at the preselected temperature to either enable a locking mechanism or to disable the unlocking mechanism for the oven door. In this way, the user is precluded from opening the door during the period when the oven cavity is at an elevated temperature. Also, the assembly of the instant application may, with proper calibration, be utilized to control the oven operations in the cook-hold range (140°) or the clean range (900°).

With the system of the present invention, the member enclosing the expansible fluid is utilized for the dual purpose of forming one of a pair of expansible members whose length increases or decreases in response to variations in temperature of the cavity in which the two members are situated, in addition to providing a pressure variation with temperature change. In the particular embodiment illustrated, the two members are interconnected to provide a differential movement in response to oven temperature change, wherein one member expands or elongates at a different rate from that of the other member in response to a preselected temperature change.

Accordingly, it is one object of the present invention to provide an improved switch assembly for use in relatively high temperature sensing applications.

It is another object of the present invention to provide an improved dual purpose temperature sensing apparatus.

It is still another object of the present invention to provide an improved temperature sensing apparatus utilizing both hydraulic expansion and mechanical expansion principles for sensing variations in temperature.

It is still a further object of the present invention to provide an improved temperature sensing assembly which is capable of sensing a large range of temperature variations without applying undue stress to certain portions of the mechanism.

It is still a further object of the present invention to provide an improved temperature sensing apparatus for sensing temperature variations within a cavity, the temperature sensing apparatus being relatively free of heat leaks from the cavity to an external environment.

It is another object of the present invention to provide an improved structure for achieving relative movement between a fixed switch contact and a movable switch contact in response to variations in temperature.

It is still a further object of the present invention to provide an improved thermally actuated switch assembly which is simple to manufacture and reliable in operation.

It is still another object of the present invention to provide an improved thermally actuated switch assembly which is easily calibrated and/or adjusted to respond to preselected sensed temperatures.

Further objects, features and advantages of this invention will become apparent from a consideration of the following description, the appended claims and the accompanying drawings in which:

FIG. 1 is a side view, partially in section, illustrating the hydraulic and mechanical elongation assemblies as applied to a structure for use in sensing temperatures of an oven cavity;

FIG. 2 is a top view of the assembly of FIG. 1 as viewed in the direction of arrow 2 thereof:

FIG. 3 is a side view of the apparatus of FIG. 1 as viewed along line 3—3 thereof and particularly illustrating the mounting of the preselected temperature responsive switch and the mounting tabs for the fluid tube assembly;

FIG. 4 is a view taken along line 4—4 of FIG. 1 and particularly illustrating the temperature responsive arm assembly for actuating the preselected temperature switch mounted on the side of the housing;

FIG. 5 is another sectional view of FIG. 1 taken along line 5—5 thereof and particularly illustrating the details of the fluid tube and the elongating member as the latter passes through the housing of the expansible fluid tube;

FIG. 6 is a top view of a modified form of the temperature sensing assembly of FIG. 1;

FIG. 7 is a sectional view of FIG. 6 taken along line 7—7 thereof and particularly illustrating the details of the switch mechanism;

FIG. 8 is a sectional view of FIG. 6 taken along line 8—8 thereof and particularly illustrating the internal portions of the fluid pressure tube, the elongating rod member and certain other details of the switch mechanism; and FIG. 9 is another sectional view of FIG. 6 taken along line 9—9 thereof and illustrating still further details of the switch mechanism.

Referring now to the drawings and particularly to FIGS. 1 to 5 thereof, there is illustrated an assembly 10 which is adapted to provide output signals in response to variations in temperature of an environment. The assembly 10 includes a fluid expansible tube assembly 12, a major portion of which is adapted to be placed in the environment to be sensed and one end of which is attached to a housing assembly 14. The tube assembly 12 includes a pressure output tube 16 which may be connected to a pressure responsive device, as for example a Bourdon tube, in an oven controller switch. The assembly 10 further includes an expansible ribbon member 18, the left portion of which is adapted to be placed in the environment to be sensed and the right portion of which is connected through a connection assembly 20 to actuate a switch 22.

Referring first to the hydraulic assembly 12 and its operation, it is seen that the assembly 12 includes a hollow tube 28 which is adapted to be filled with an expansible fluid, as for example, nitrogen or helium. In the preferred embodiment, helium is being utilized. The pressure within the tube is transmitted through a second hollow tube 30, forming part of pressure output tube 16, one end of which is telescopically positioned within the first tube 28 by means of a leak-proof nipple 32. The nipple 32 includes a flange portion 34 which is welded or otherwise sealed to the inside circumference of the tube 28 and a nipple portion 36 is welded or otherwise sealed to the outside circumference of the tube 30. Thus a leak-proof connection is made between the tube 28 and the end of the tube 30. The right end 38 or output end of the tube 30 is connected to or is extended to form a connecting member which is attached to a transducer for translating fluid pressure into mechanical motion, as for example the Bourdon tube discussed above. This Bourdon tube may be utilized to actuate the fixed contact of the oven heater controller or other assembly.

In an oven cavity type of installation, there is formed an inner and outer wall of the oven, with insulation placed therebetween. The tube 28 is inserted into the oven cavity with a portion of the housing assembly 14 positioned between the inner and outer liner of the cavity. Accordingly, it has been found necessary to insure that the heat from within the cavity does not leak into the space between the inner and outer liner, thus precluding the possibility of damaging the insulation by fire or heat. In order to prevent this leakage, the housing 14 includes an outer housing member 40, one end 42 of which is formed with an inverted or concave nipple portion 44 suitably welded at 46 to the right end of the tube 28. The nipple 44 is formed with aperture 50 which is adapted to pass the tube 30 therethrough into the exterior of an inner housing member 54.

The nipple portion 44 is also formed with a cylindrical flange 56, the outside diameter of which snugly fits the inside diameter of the inner housing 54. The cylindrical portion 56 may then be welded to the inner diameter of the inside housing 54 to seal the inner housing 54 to the outer housing 40. The outer housing 40 is provided with a pair of inwardly bent tabs 58, 60 punched from the outer housing 40 wall and are utilized to centrally locate the inner housing 54 relative to the outer housing 40. The housing 40 is further provided with a cover member 62 attached to the housing 40 by means of tabs 64, 66, 68 and 70. The purpose of the cover member 62 will be explained in conjunction with the description of the connecting assembly 20. The housing 40 is further provided with a pair of mounting tabs 74 and 76 (FIGS. 3, 4 and 5) which are utilized in mounting the housing 40 on the inner lining of the oven cavity.

Referring now to the thermally expansible member assembly which includes member 18, it is seen that the member 18 is rigidly fixed to the left end of the tube 28 by means of a welded portion 80 to rigidly fix the end of the expandable member 18 to the fluid tube 28. Thus, as the tube 28 and member 18 are heated, the tube 28 will elongate in a direction to the left relative to the housing 14 and the expanding member 18 will move to the right relative to the end of tube 28 due to the fact that the member in 18 is fixed at 80.

In the preferred embodiment, the material for tubular member 28 and ribbon 18 is chosen such that there is a differential expansion of the members, one relative to the other, the tubular member 28 elongating a greater distance for a given temperature change than the ribbon member 18. Thus, the net affect of heating the tubular member 28 and ribbon member 18 is that the right end of the ribbon member 18 will move to the left with an application of heat. Obviously, the opposite affect could be achieved by the proper selection of materials for tube 28 and ribbon 18 and the selection of the coupling members to take a compressive load.

The motion of ribbon member 18 is transmitted to the switch assembly 22 by means of a connecting ribbon 82 and the arm assembly 20. The switch 22 is of the push button type which includes a button 84 mounted on one face of a housing 86, as is common in the art. The button 84 is adapted to be engaged by means of an arm 88 which either depresses or releases the button 84 in response to the movement of the arm 88. With the illustrated arrangement, the application of heat to the tubular member 28 and ribbon 18 will cause the member 82 to move to the left, and thus the button 84 will move to the left. The ribbon 82 is welded at the left end 90 to the ribbon 18 and is also welded or similarly fixed to a tab 92 formed from a main body member 96.

The specific details of the connecting member 20 are best illustrated in FIG. 4 wherein the main body portion 96 includes a pair of downwardly bent tab portions 98, 100 which provide longitudinal rigidity to the body portion 96. The tab 92 is formed by punching out a portion of the body portion 96 and bending the punched out portion downwardly or inwardly toward the hydraulic tube assembly. The motion of the tab portion as affected by the elongation and contraction of the expanding member 18 is transmitted to a flexible arm 88 which is adapted to engage the button 84 to either depress the button when heat is applied or release the button when the assembly is permitted to cool.

The assembly 20 is retained in the housing 40 and particularly in wall 42 by means of a cutout 106 which receives the arm 88 and also by means of a cutout 108 formed in the opposite wall 110. The apertures 106 and 108 are of sufficient dimension to permit the relative free movement of the connector arm assembly 20 in the left and right direction as viewed in FIG. 1 and relatively closely fit the connector assembly 20 in the transverse direction to preclude any transverse movement of the assembly. The tab portion 112 is integrally formed with the main body portion 96 in the preferred embodiment and the flexible arm 88 is attached to the body portion 96 by any known method, as for example welding, in the portion designated 114.

The switch is seen to be rigidly attached to a wall of housing 40, as for example by a through rivet 120 to position the button 84 directly below the arm 88. The cover 62 is formed with an extension 122 which overlies the flexible arm 88 to protect the arm 88 from any foreign material or damage caused by inadvertent blows. The extention 122 is integrally formed with the cover 62 and includes three bent down tabs 124, 126 and 128 which generally enclose the arm 88. The cover assembly 122 does not engage either the arm 88 or the button 84 and merely forms a protective cover therefor.

Referring now to FIGS. 6 to 9, there is illustrated a modified form of the invention wherein the switch mechanism, which is adapted to respond to the elongation and contraction of the tube and ribbon assembly, is wholly contained within the housing mounted between the inner and outer oven cavity. Specifically, the modified assembly includes a fluid tube and elongating rod assembly 220, one end of which is fitted into a housing assembly 222 containing a switch assembly 224. The assembly 220 includes a fluid tube 230 which is a generally hollow configuration having a plug 232 inserted at one end to render the tube fluid tight. The opposite end of the tube includes a second plug member 234 containing an aperture 236 which is adapted to snugly fit a thin tubular member 238. The thin tubular member 238 provides a connection to a transducer which is adapted to change the fluid pressure to a mechanical movement. The right end of the tube 230 is rigidly fixed to the housing assembly 222 at 240 by any suitable means, as for example welding, to form a fluid tight seal between the housing assembly 222 and the tube 230.

The housing assembly includes an outer housing member 244 having a flanged portion 246 which is adapted to be fixed to the outer wall of the oven. The housing further includes an annular member 247, the inner edge of which is formed as an inwardly directed flange 248 utilized in forming the seal with the tube 230.

The differential expansion assembly includes, in addition to the tube 230, a rod 250 which is rigidly attached at one end thereof to the tubular member 230 by means of a connecting member 252. The rod 250 is attached by means of a sleeve 254 to the switch mechanism 224 to transmit the elongation and contraction of the tubular member 230 and rod 250 in response to variations in sensed temperature. As was the case with the previous embodiment, the tubular member 230 elongates to a greater degree per unit of temperature change than does the rod 250 thus providing a net movement to the left of the connecting tube 254. The elongating and contracting movement of the assembly is guided by means of a pin 258 which is slidably contained within a flange member 260 mounted on a wall member 262, which may form part of the inner lining of the oven.

The switch assembly 224 is mounted on a nonconductive mounting member 261 attached to the housing 244 by means of a cup-shaped inner member 263. The inner member 263 includes a plurality of tabs 264 which extend through apertures 266 formed in the mounting member 261, the tabs 264 being adapted to be rotated to fixedly secure the member 261 relative to the inner housing member 263 in an outward direction. The mounting member 261 is utilized in mounting a plurality of fixed contacts 270, 272, the contact 270 being mounted on the member 260 by means of an arm 274 and a terminal blade 276. The contact 272 is fixed relative to the bore 260 by means of a rivet 278, the base of the contact 272 being bent to pass through the member 260 and form a terminal 280.

The contacts 270, 272 are spaced, one from the other, and are adapted to be engaged by a pair of movable contacts 284, 286 mounted on a movable arm 288 connected to an output terminal 289, the movable arm 288 being adapted to be moved in response to the elongation and contraction of the tube 230 and rod 250 assembly. Accordingly, when the tube 230 and rod 250 are heated, the contacts 270, 284 are in mating engagement and the contacts 272, 286 are open. The opposite situation occurs when the sensed environment is below the preselected temperature, that is, the contacts 272, 286 are closed and the contacts 270, 284 are opened. The position of the contact 270 is adjusted to select the operating temperature by means of an adjusting screw 292 which is in threaded engagement with a collar 294 seated in an aperture 296 formed in the member 260. When the screw 292 is threaded against the arm 274, the distance between the contacts 270, 284, is increased thus increasing the temperature which the environment must attain before closure of the contacts 270, 284.

The tube 254 is interconnected with the contact arm 288 by means of a pair of washer members 297, 298. The arm 288 is biased outwardly toward member 261 by means of a spring member 290, the contraction of the bar 250 acting against the spring to move arm 288 and close the contacts 270, 284. The relative position of arm 288 may be adjusted by means of an adjusting screw 299.

While it will be apparent that the embodiments of the invention herein disclosed are well calculated to fulfill the objects of the invention, it will be appreciated that the invention is susceptible to modification, variation and change without departing from the proper scope of fair meaning of the subjoined claims.

What is claimed is:

1. A dual thermal switch assembly providing a combination electrical output signal and a varying pressure output signal in response to the temperature change of an environment, the assembly comprising means for providing a pressure signal in response to a change in temperature in the environment including a hollow member having a portion thereof formed as a hollow tube, said hollow member having a thermally sensitive fluid contained at least in said hollow tube portion, at least a portion of said tube being placed in the environment to be sensed and being fabricated of a material which elongates and contracts in response to temperature change, said fluid providing a pressure change in response to a temperature change in the environment, and means for providing an electrical signal in response to a change in the environmental temperature including said tube member, an elongating and contracting movable member in the environment connected to said tube portion, portions of said tube and said movable member elongating and contracting in such a manner as to provide a relative movement of a point on said movable member relative to a point on said tube portion remote from the connection of said movable member to said tube portion, and a switch fixedly supported relative to one of said tube and said movable member and mechanically connected to the other of said tube and said movable member, said switch being actuated in response to the said relative movement in response to the elongation and contraction of both said tube and member.

2. The assembly of claim 1 further including a support assembly, a portion of said tube member being fixedly supported relative to said support assembly, and said movable member being movably supported relative to said support assembly.

3. The assembly of claim 2 wherein a portion of said switch is fixedly supported relative to said support assembly and another portion of said switch is movable relative to said fixed portion in response to the relative movement of said movable member.

4. The assembly of claim 2 wherein said movable member includes one end fixedly connected to one end of said tube and the other end of said member is movable relative to said support assembly as a function of the differential contraction and expansion of said tube and said member.

5. The assembly of claim 1 wherein said electrical signal providing means includes a connection assembly for connecting said movable member to said switch, said connection assembly including resilient means for preventing the overactuation of said switch in response to temperatures at an extreme end of the environmental temperature range.

6. The assembly of claim 5 wherein said connection assembly includes a connecting member having a tab portion connected to said movable member and a further portion connected to said resilient means.

7. The assembly of claim 6 wherein said tab portion and said further portion are formed from the main body of said connecting member.

8. The assembly of claim 7 wherein said tab portion and resilient means are substantially out of line, one with the other.

9. The assembly of claim 8 further including a housing assembly having a cover member and a body, said connection assembly being partially enclosed within said body and partially within said cover member.

10. The assembly of claim 9 wherein said cover member is formed with an integrally formed extension portion extending beyond said body and overlying a portion of said resilient means for protecting said resilient means from damage.

11. An assembly for providing a combination mechanical output signal in response to temperature change in an environment and a hydraulic signal in response to the temperature change comprising a hollow tube fabricated of a material that elongates and contracts in response to temperature change, an expansible fluid in said tube having a characteristic which varies in response to temperature changes, pressure responsive means connected to one end of said tube and in fluid communication with said expansible fluid for providing said hydraulic signal, and an elongating and contracting member supported in the temperature changed environment and attached to and supported by said tube at one end thereof, the elongating and contracting characteristic of said hollow tube being different from the characteristic of said member whereby the other end of said member moves a distance relative to the other end of said tube which is a function of the elongation and contraction movement of said tube and said member.

12. The assembly of claim 11 further including a support assembly, a portion of said tube being fixedly supported relative to said support assembly, and said member being movably supported relative to said support assembly.

13. The assembly of claim 12 wherein said movable member includes one end fixedly connected to one end of said tube and the other end of said member is movable relative to said support assembly as a function of the differential contraction and expansion of said tube and said member.

References Cited

UNITED STATES PATENTS

| | | | |
|---|---|---|---|
| 2,782,285 | 2/1957 | Cantlin | 337—394 |
| 2,851,559 | 9/1958 | Rosen | 337—338 |
| 3,045,085 | 7/1962 | Reingruber | 337—389 |
| 3,327,094 | 6/1967 | Martin et al. | 219—393 |
| 3,408,506 | 10/1968 | Bergsma | 219—413 X |
| 3,409,758 | 11/1968 | Hild et al. | 219—413 |

H. B. GILSON, Primary Examiner

U.S. Cl. X.R.

219—413; 337—389